United States Patent [19]

Doty

[11] 4,452,470
[45] * Jun. 5, 1984

[54] TENSION RELIEVING MECHANISM

[75] Inventor: Gerald A. Doty, Crown Point, Ind.

[73] Assignee: Gateway Industries, Inc., Hazel Crest, Ill.

[*] Notice: The portion of the term of this patent subsequent to Nov. 30, 1999 has been disclaimed.

[21] Appl. No.: 340,859

[22] Filed: Jan. 20, 1982

[51] Int. Cl.³ .................. A62B 35/02; B65H 75/48
[52] U.S. Cl. ......................... 280/802; 242/107.7; 280/807
[58] Field of Search ............ 242/107.7, 107.6, 107.12, 242/107.4 R–107.4 E, 99, 84.3; 280/806–808, 802, 803; 297/474–478

[56] References Cited

U.S. PATENT DOCUMENTS

| | | | |
|---|---|---|---|
| 2,145,474 | 1/1939 | Burdick et al. | 242/84.3 |
| 2,159,004 | 5/1939 | Bosch | 242/107.7 |
| 2,209,467 | 7/1940 | Moore | 242/99 |
| 3,323,750 | 6/1967 | Worth et al. | 242/107.4 R |
| 4,065,072 | 12/1977 | Magyar | 242/107.7 |
| 4,361,294 | 11/1982 | Doty | 280/802 X |

Primary Examiner—John M. Jillions
Attorney, Agent, or Firm—Fitch, Even, Tabin & Flannery

[57] ABSTRACT

A new and improved tension relieving mechanism is provided which may be easily controlled and which has few operating parts. The tension relieving mechanism utilizes a coiled spring for clutching a turnable member connected to the seat belt reel shaft. Members associated with the seat belt retractor provide camming and stopping surfaces to engage end portions of the clutch spring to alternately expand and allow contraction of the spring coil to release or grip a frictional surface of the turnable member. With the clutch spring abutting a stopping surface and urged by the reel spring in a belt retraction direction so that the natural contraction of the clutch spring on the frictional surface is encouraged, the reel shaft is locked against rotation in the belt retraction direction providing a release of tension on the belt. The grip of the clutch spring on the turnable member may be released with a minimal amount of force by urging the end portions of the clutch spring radially outward to enlarge the clutch spring coil.

12 Claims, 14 Drawing Figures

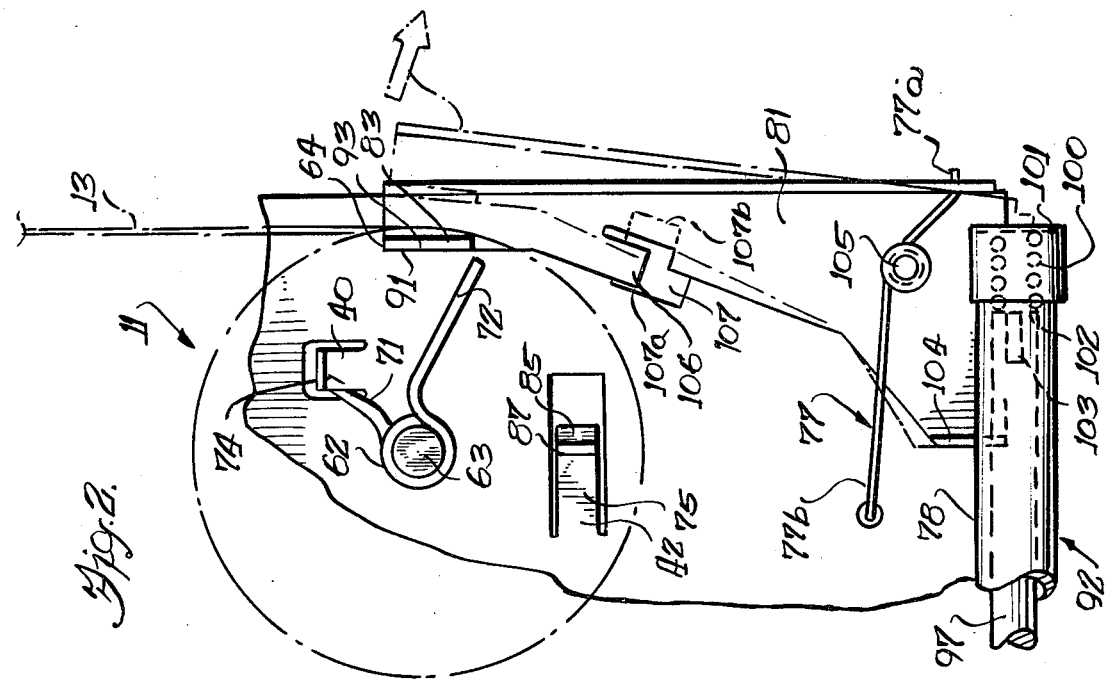
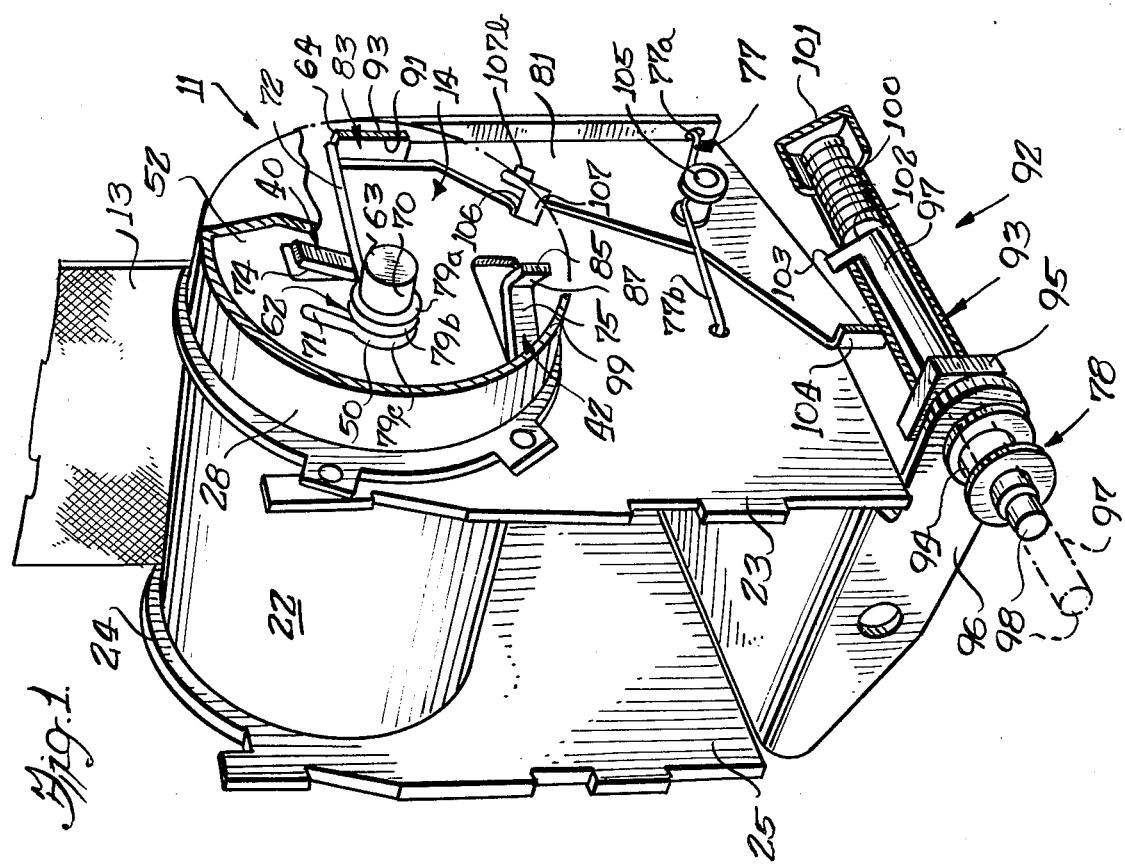

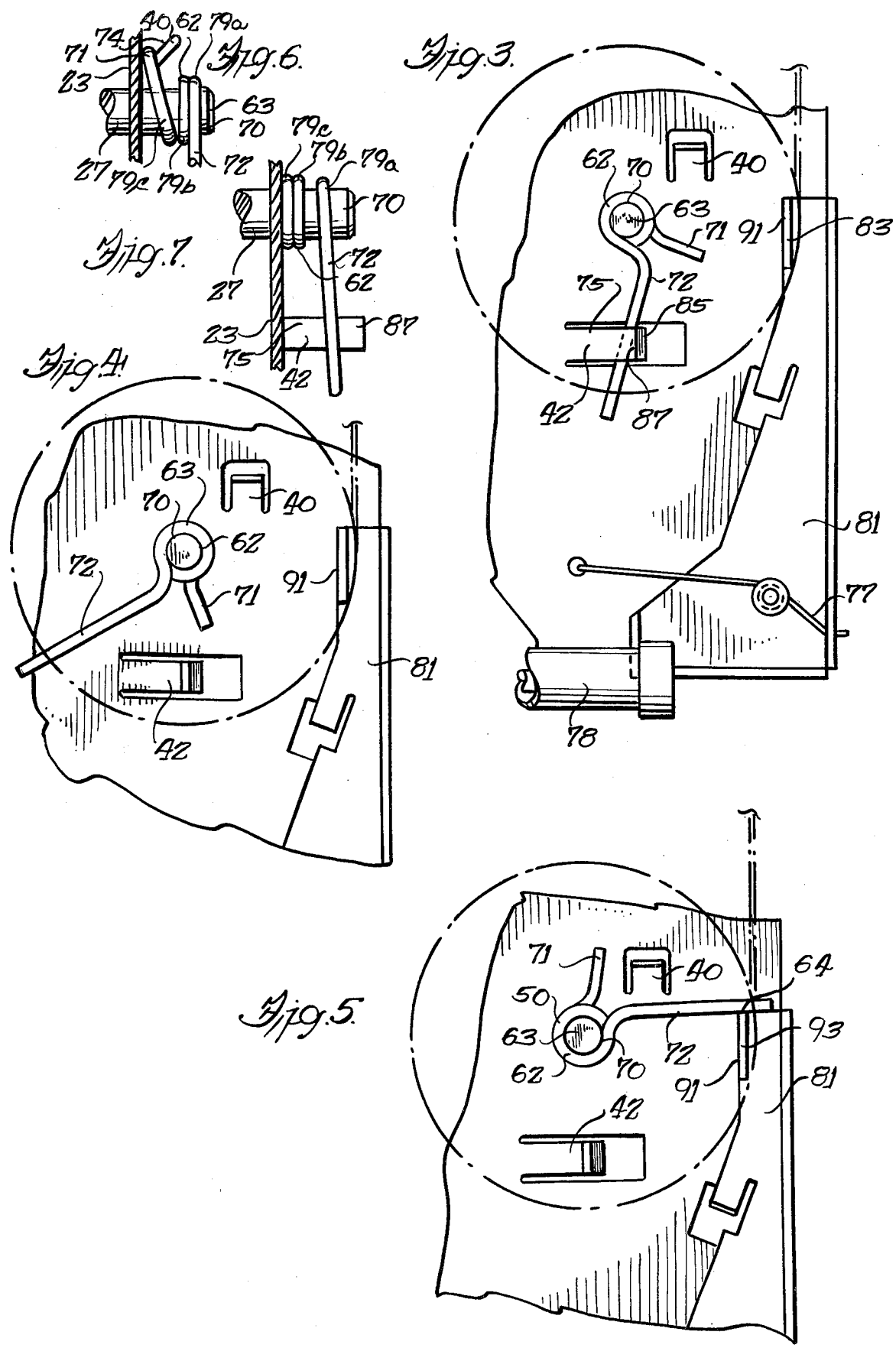

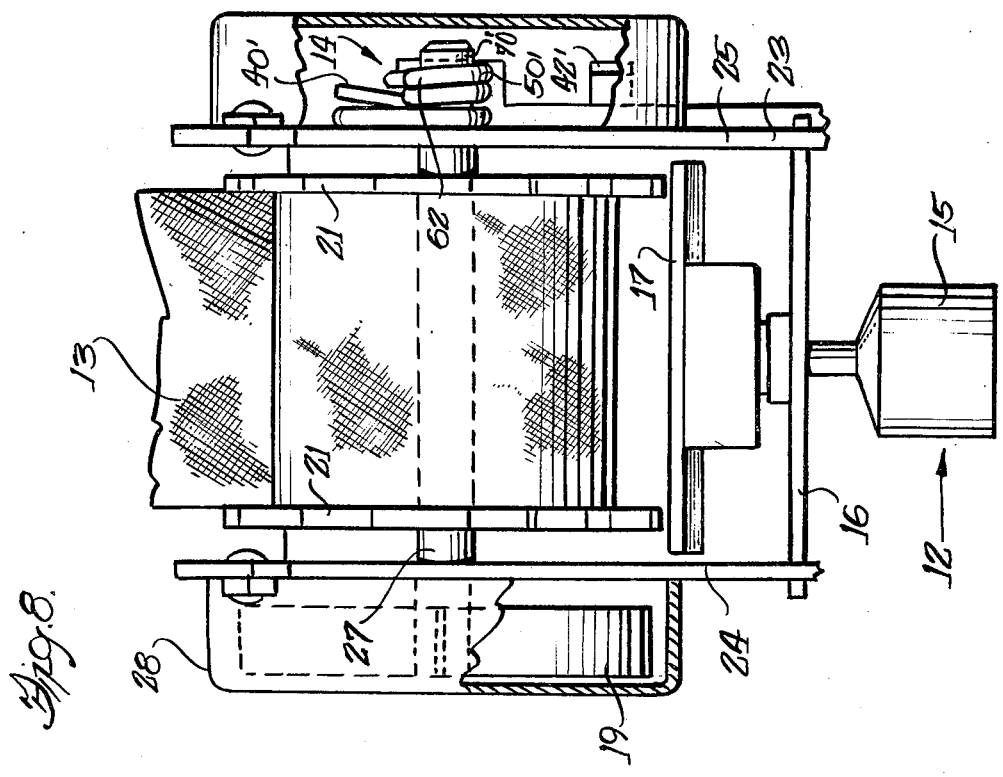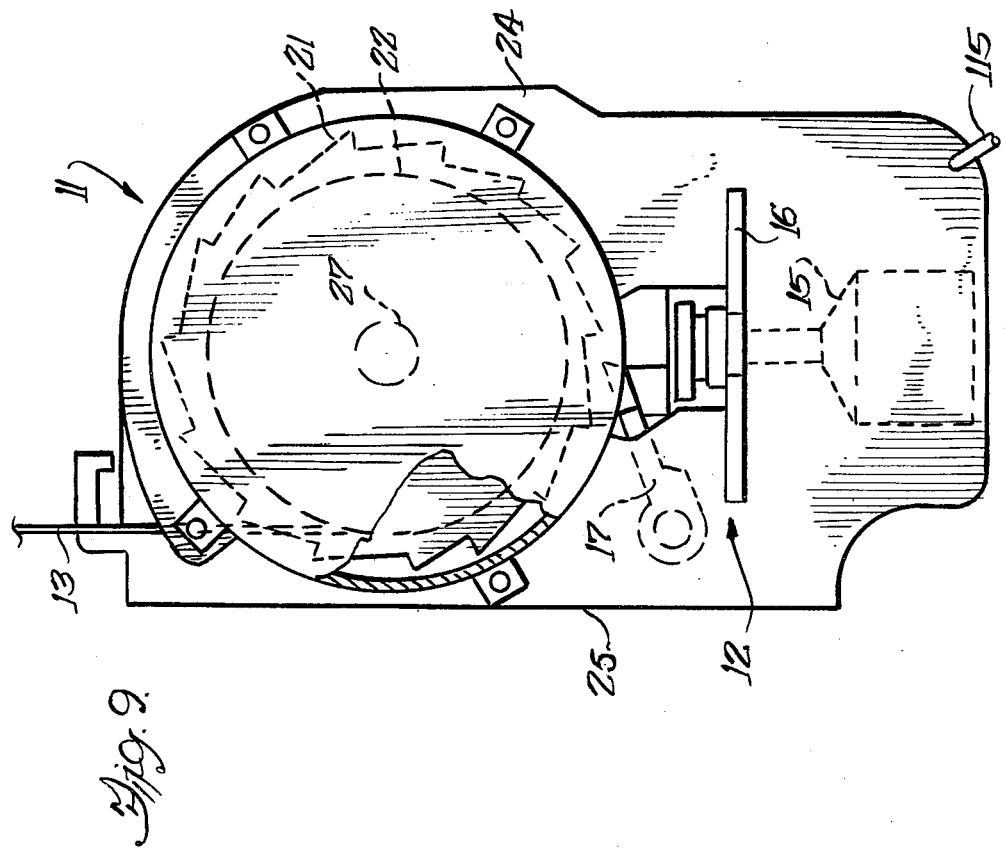

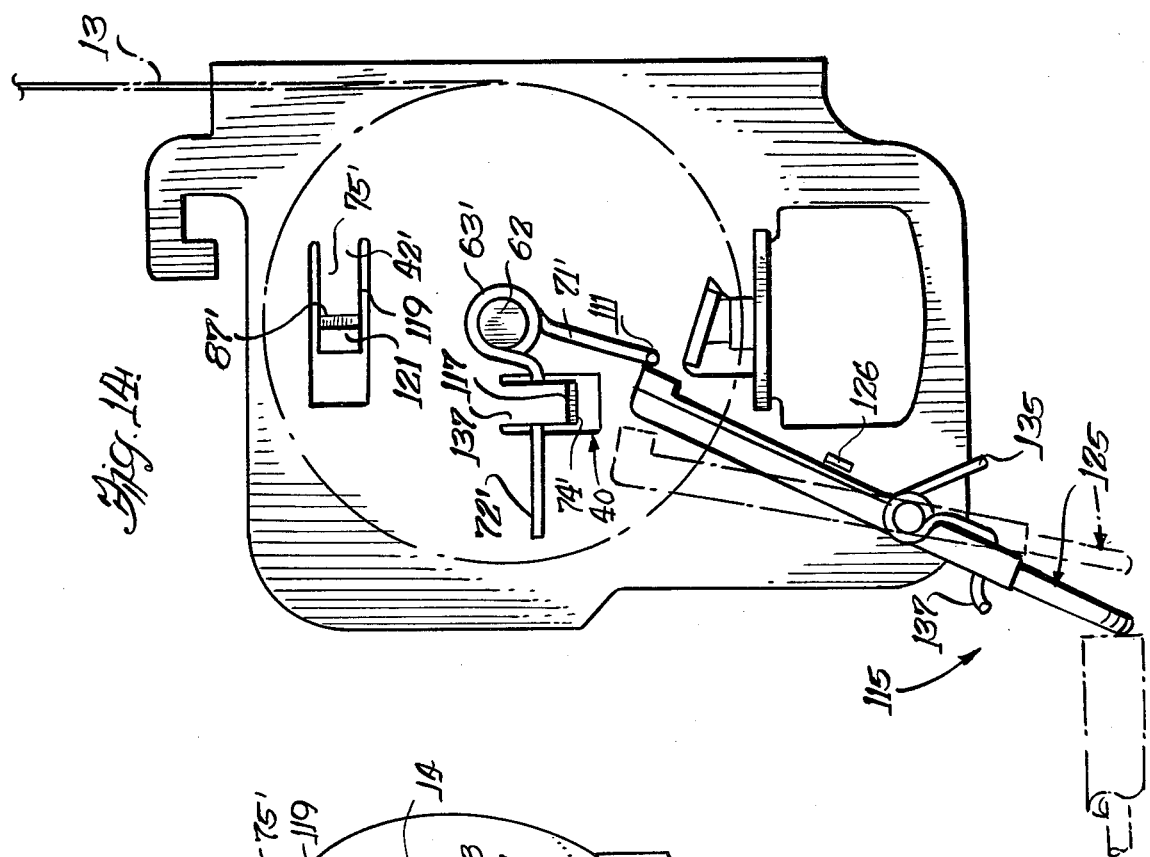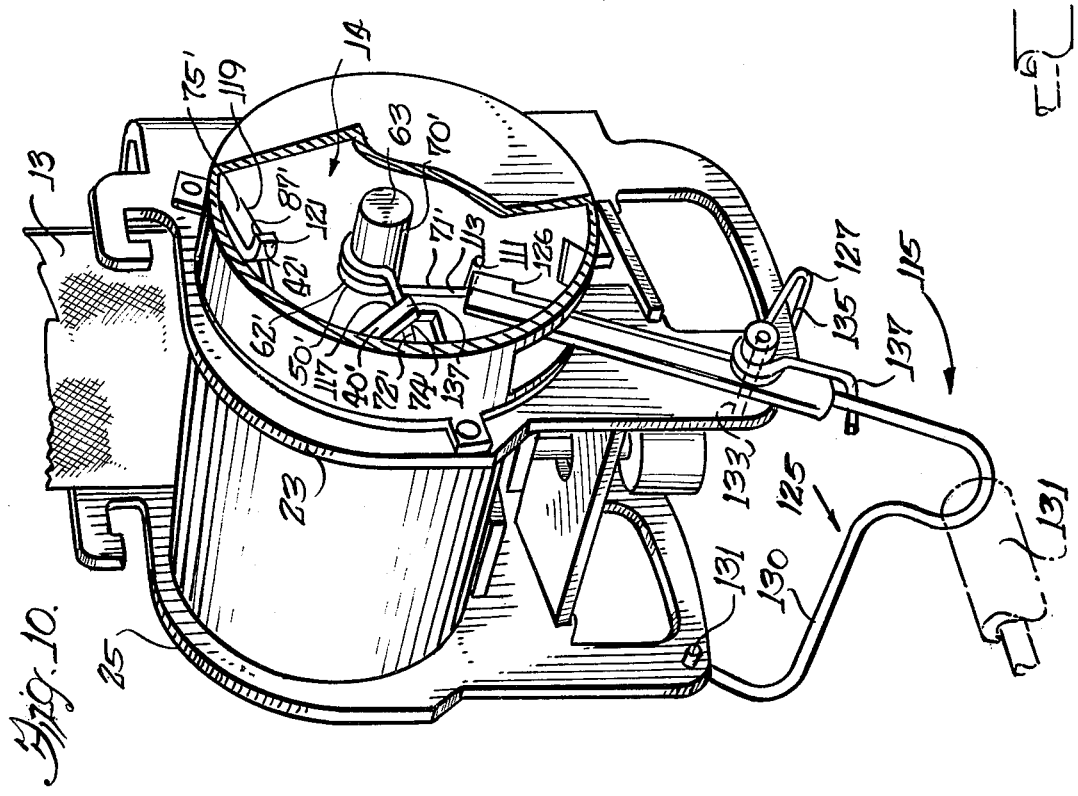

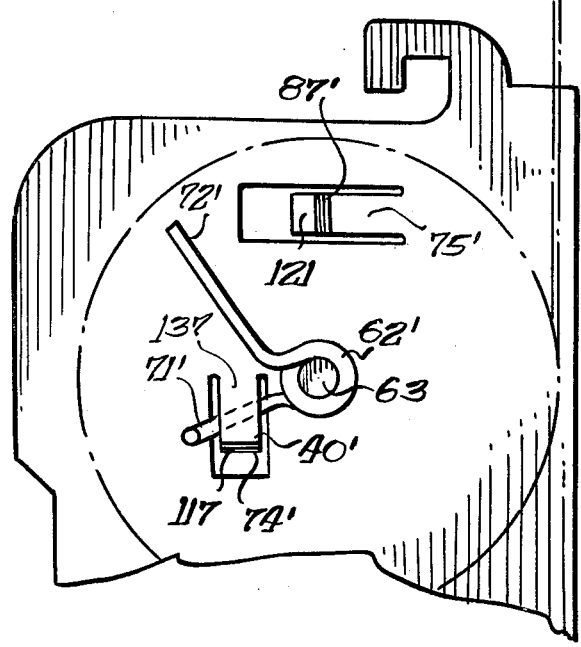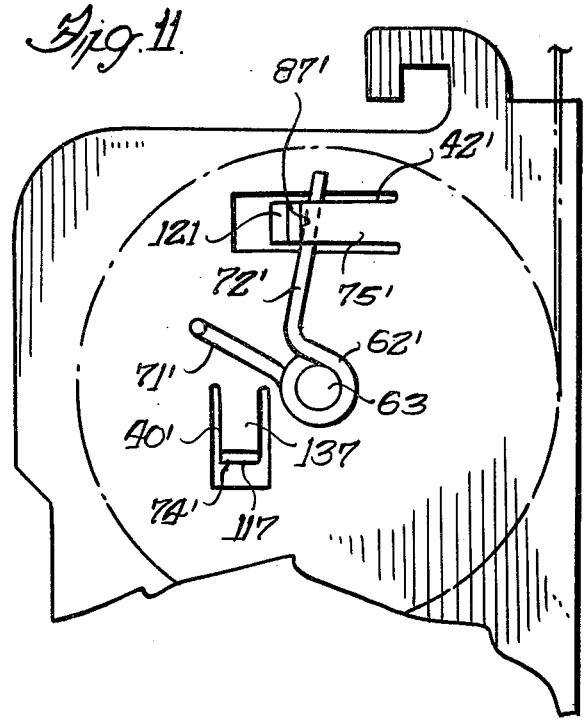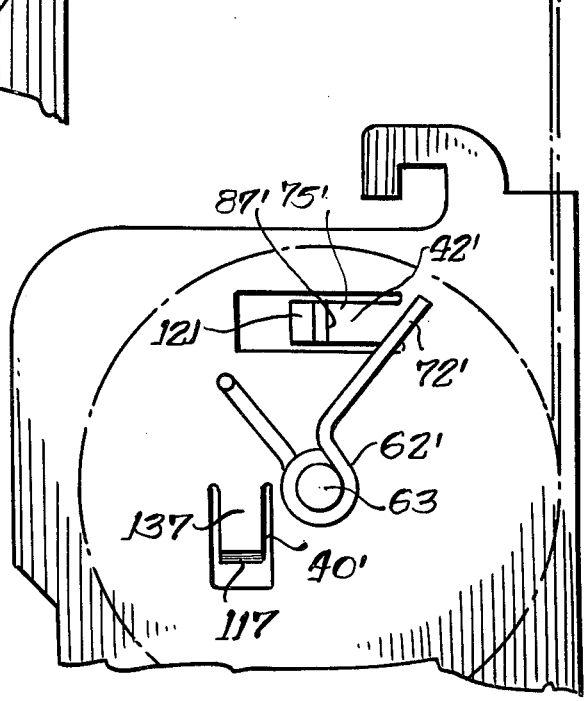

TENSION RELIEVING MECHANISM

This invention relates to a safety belt system and more particularly to a system having a mechanism for relieving the seat belt engaging the passenger's body from the force from the reel winding spring.

This invention is directed to a belt system having a shoulder belt connected to a belt retractor having a winding spring which exerts tension on the belt to rewind the shoulder belt when the belt is removed from the wearer. Present seat belt retractor systems, particularly the so called "single loop" systems, have a large or heavy winding spring to assure that the lap belt is pulled tightly across the wearer through a sliding D ring or tongue plate of a three-point restraining belt system. In the single loop and other three-point systems, it has been proposed to provide tension relieving devices, typically using discs to operate a pawl into and from engagement with a detent wheel fixed to the reel shaft. Such devices are shown in U.S. Pat. Nos. 3,851,836; 3,869,098 and 3,834,646. To assure release of such devices when a door of the vehicle is opened, it has been proposed in U.S. Pat. No. 3,973,786 to provide means operable by the door to shift the pawl to a release position to assure that the winding spring will rewind the seat belt, if it was not previously rewound, as the occupant opens the vehicle door to exit. The typical remotely controlled mechanism for releasing the tension relieving mechanism requires a turning of the retractor reel in the protraction direction for a slight distance to allow the pawl to be lifted from toothed engagement with the detent wheel. This is because the rake of the teeth on the detent wheel causes the tip of the detent wheel teeth to overhang the pawl preventing a simple outward movement of the pawl. These remote control release mechanisms have become heavy and complex in their mechanisms to overcome the strong retractor spring and to pivot the pawl from the detent wheel; and, as such, they have become expensive.

The use of a solenoid to operate the tension relieving mechanism has also been disclosed in U.S. Pat. No. 4,002,111. Other proposals have been to provide a counterbiasing spring which acts in opposition to the winding spring and is connected thereto by a selectively operated pawl means. Such a proposal is disclosed in U.S. Pat. No. 4,026,494. Other proposals have been made to similarly connect counterbiasing springs which bias the reel in a belt unwinding direction when connected to the reel. In these systems, camming discs have been used to effect the connection and/or disconnection of the counterbiasing springs to the reel. When connected, the counterbiasing spring effectively substracts from the winding torque of the reel winding spring to reduce the belt tension load on the occupant's shoulder.

Although some of the above-described proposals are in use, they generally involve a number of pieces which are relatively expensive by the time they are assembled and secured onto the retractor. Thus, there is a need for a new and improved kind of tensionless mechanism which eliminates the pawl and detent wheel and which may be released with a more simple mechanism requiring less force for operation thereof.

Accordingly, a general object of the invention is to provide a new and improved tension relieving retractor.

These and other objects and advantages of the invention will become apparent from the following detailed description taken in connection with the accompanying drawings in which:

FIG. 1 is a perspective view of a seat belt retractor having a tension relieving mechanism embodying various features of the present invention;

FIG. 2 is an elevation view of the tension relieving mechanism of FIG. 1;

FIG. 3 is an elevation view of the tension relieving mechanism during belt protraction;

FIG. 4 is an elevation view of the tension relieving mechanism in its memory position;

FIG. 5 is an elevation view of the tension relieving upon subsequent release of the belt and in the tensionless mode;

FIG. 6 is an elevation view of the clutching spring with the coils expanded and moving axially inward;

FIG. 7 is an elevation view of the clutching spring with the coils expanded and moving axially outward;

FIG. 8 is a front elevation view of a seat belt retractor having a tension relieving mechanism embodying an alternate embodiment of the present invention;

FIG. 9 is a side elevation view of the retractor shown in FIG. 8;

FIG. 10 is a perspective view of the retractor of FIG. 8 illustrating the tension relieving mechanism thereof;

FIG. 11 is an elevation view of the tension relieving mechanism as the belt is protracted;

FIG. 12 is an elevation view of the tension relieving mechanism of FIG. 8 after the belt is subsequently released;

FIG. 13 is an elevation view of the tension relieving mechanism of FIG. 8 during activation to the tension release mode; and FIG. 14 is an elevation view illustrating the tension relieving mechanism of FIG. 8 in the tension release mode and illustrating deactivation from the tension release mode by a pivoted lever.

As shown in the drawings for purposes of illustration, the invention is embodied in a conventional safety belt retractor 11, such as that illustrated in FIGS. 8 and 9, which may be of various shapes or configurations but typically includes an emergency operating locking mechanism 12 for operating to prevent further belt extraction at the time of an accident. While the emergency operating locking mechanism 12 may be of the belt or reel sensitive kind operated by fast protractions of the belt 13, the preferred emergency locking mechanism is of the vehicle inertia operated kind which comprises a pendulum weight 15 as shown in the embodiment illustrated in FIG. 8 mounted on a support bar 16 for swinging movement to operate a pivotally mounted locking bar or panel 17 to pivot into locking engagement with a pair of ratchet wheels 21 mounted on opposite sides of a webbing reel 22 mounted for rotation on a reel shaft 27 extending between opposite vertical frame sides 23 and 24 of a retractor frame 25. The reel shaft 27 is journaled to rotate in the side frames 23 and 24 and a spirally wound clock-like spring 19 is attached to one end of the reel shaft 27 to rewind the seat belt 13. This rewind spring 19 is mounted within a protective cover 28 attached to the side frame 24.

Commonly employed, tension relieving mechanisms, such as shown in U.S. Pat. No. 3,834,646, have a tension relieving pawl and ratchet mechanism which is connected to the reel shaft with the tension relieving pawl being shifted by a pair of disk-like cams into and from the locking relationship with the tension relieving ratchet wheel which is mounted on the reel shaft. An associated cost is the high cost of the conventional remote control mechanism which senses when the door of the vehicle is opened so as to operate the tension relieving mechanism to its release position to assure that the seat belts are wound and are not left in the tensionless mode. Present automatic and remote control apparatus are quite cumbersome in complexity and size and therefore costly.

In accordance with the present invention, a new and improved control means 52 actuable by a car door to operate the tension relieving means 14 has a coiled spring means 50 (FIG. 1) with a spring coil 62 for frictionally gripping a turnable member 63 connected to and turnable with the reel 22. Herein, the control means 52 includes a remote actuator 78 which changes the diameter of the coil to either frictionally grip a friction surface 70 on the turnable member or to release the friction surface. The control means 52 is also operable by belt manipulation and include engagement members 40, 42 that are preferably integral with one of the sides 23 of the retractor frame 25 to engage end portions or tangs 71, 72 of the coil for releasing the frictional grip and a stopping surface 64 engageable with one of the end portions 72 for gripping the friction surface to prevent rewind tension on the belt 13, as will be explained in detail hereinafter. The coiled spring means 50 is axially shiftable along the turnable member 63 by camming surfaces of the engagement members 40, 42 to alternately move the end portions 71, 72 into alignment with the various stopping and camming surfaces 74, 75 of the control means 52. A very light force is needed to release the frictional engagement of the coil 62 with the turnable member 63. The remote actuator 78, operable, for example, by the door of the vehicle in which the retractor 11 is installed, cooperates with the end portions 71, 72 to cause a release.

Referring now in greater detail to the embodiment illustrated in FIGS. 1–7, the preferred turnable member 63 is an extension of the reel shaft 27, and the preferred coil spring means 50 is a single piece of coiled spring wire. The spring means 50 comprises a central cylindrical clutch coil 62 having multiple turns, for example three turns 79a, 79b, 79c (FIGS. 6 and 7), wound for an interference fit with the shaft extension 63 and straight end portions or tangs 71, 72 which extend generally tangentially to the shaft axis from the inner and outer ends of the coil. The coil turns 79 each have an inner diameter which is less than the outer diameter of the shaft extension 63 so that when the coil 62 is released and relaxed, the turns contract and tightly grip the friction surface 70 of the shaft extension 63, and when the spring is held against turning, the spring prevents the shaft 27 from turning. As will be explained in greater detail hereinafter, to release the tensionless mechanism, it is merely required to shift one of the tangs 71 or 72 in a radially outward direction away from the shaft extension 63 to slightly increase the diameter of the coil 62 which then releases the friction surface 70 allowing the reel shaft 27 and reel 22 to turn.

The control means 52 for controlling the gripping or releasing of the shaft extension 63 includes a first engagement member 40 stamped from and bent at an angle outward from the plane of the frame side 23. The engagement member 40 is disposed closer to the shaft extension 63 in a radial direction than the second engagement member 42 and protrudes sufficiently outward from the frame side 23 that the inner tang 71, whether in its inward axial position or its outward axial position, will abut the inner tang and capture the same between the camming surface 74 and the frame side 23 and will thereby hold the tang 71 against further turning in the clockwise direction. Thus, one function of the engagement member 40 is to serve as a stop for the inner tang 71 and to thereby limit rotation of the coil 62 in the clockwise direction. If the inner tang 71 is in its outward axial position, it will contact of the camming surface 74 near its outer free end and it will be cammed inward before stopping.

The control means 52 for controlling the expansion or contraction of the spring coil 62 on the shaft extension 63 includes a second engagement member 42 stamped from and bent at an angle outward from the frame side 23. The second engagement member 42 is disposed outward from the shaft member 63 relative to the first engagement 40 so that the end of short inner tang 71 passes thereby without abutting the same during rotation of the coil. Cam surface 75 of the second engagement member 42 is inclined outward from the frame side 23 and will cam the longer outer tang 72 outward relative to the shaft entension 63 as the coil carries the longer tang 72 in a counterclockwise direction across the cam surface 75. The outer end 85 of the second engagement member 42 is further bent, generally perpendicularly outward from its camming surface 75 providing a stop 87 to stop the outer tang 72 in its counterclockwise movement and thereby limit rotation of the coil 62 in the counterclockwise direction. The outer tang 72 is spaced axially outward along the shaft end 63 relative to the inner tang engagement member 40 whether the coil 62 is in its inward or outward axial position.

The control means 52 for operating the tension relieving mechanism further includes a remote actuator 78 usually operated by a vehicle door to cause the tension relieving mechanism 14 to release the shaft extension 63 to allow the seat belt to be rewound, if it was not previously wound. The remote actuator 78 includes a pivoted lever 81 biased by a spring 77 counterclockwise (in reference to FIG. 2) to a tang-contact position (shown in solid) as determined by the rest or closed-door position of the remote actuator 78. In its tang-contact position, the upper end 83 of the lever 81 is disposed to have its top edge 64 positioned to intercept the clockwise sweep of the outer tang 72 when the coil 62 is in its inward axial position. The width of the upper end 83 of the lever 81 is such that it will not abut the outer tang 72 when the coil 62 is in its outward axial position and the tang passes along vertical edge 93 of the upper lever end 83. However, when the coil spring and the outer tang 72 are in their inward axial position and the tang 72 approaches the stop 64 while turning counterclockwise, the tang 72 hits the flat vertical contact surface 91 of the contact end 83 and pivots the lever 81 momentarily in a clockwise direction (as shown in ghost in FIG. 2) allowing the outer tang to pass thereby.

The remote actuator 78 includes a plunger mechanism 92 which pivots the lever 81 between its operative position shown in FIG. 1 in which the longer tang 72 abuts and rests on the stop edge 64 of the lever 81 and its inoperative position shown in dashed lines in FIG. 2 where the stop edge 64 of the lever is pivoted from engagement with the longer tang 72. The push-pull plunger mechanism 92 is conventional in commercially available automobiles and hence will only be briefly described. The plunger mechanism includes a stationary housing 93 with a tubular body 94 mounted horizontally by a nut fastener 95 to a vertical side flange 96 on the retractor side plate 23. Slideably mounted in the housing 93 is a reciprocal plunger 97 having an outer free end 98 to be abutted by a car door (not shown). The plunger 97 is shown in solid lines in FIG. 1 in the position it assumes when the car door is closed and in dotted lines in the position it assumes when the car door is opened. The plunger 97 is biased to the left in FIGS. 1 and 2 by a spring 100 carried in the right hand end of the hollow tubular body 94. The spring 100 has one end abutting end cap 101 of the housing body 94 and its other end abutting the right hand and internally disposed end 102 of the plunger.

To operate the lever 81 between its operative and inoperative positions with opening or closing of the car door, the plunger 97 has a laterally extending projection or finger 103 which is positioned to the rear, i.e., to the right as viewed in FIG. 1, of a lever projection 104 on the lever 81. The plunger finger 103 slides in a slot in the tubular housing body. When the door is closed and the plunger 97 is pushed further into the housing body, the tab moves rearward from contact with the lever projection 104. The torsion spring 77 has its end 77a connected to the lower right end of the lever and biases the upper end of the lever to pivot counterclockwise about a fixed pivot pin 105 which projects outwardly from the side frame 23. The torsion spring has a coiled central portion coiled about the pivot pin and another end 77b fastened in a hole in the side frame 23. The lever 81 is limited in its turning movement by a stop means in the form of an inturned tab 106 which projects into an opening 107 in the side frame 23. In the operative position, the left edge of tab 106 hits edge wall 107a of the opening 107 to limit counterclockwise turning of the lever to the position shown in solid lines in FIG. 2. The right hand edge of the tab 106 will hit the edge wall 107b of the opening 107 to limit clockwise turning of the lever 81 to the dotted line position shown in FIG. 2. Thus, the torsion spring 77 is effective when the door is closed to pivot the lever 81 to abut the stop tab 106 against stop wall 107a; and the plunger finger 103 is effective when the door is open to pivot the lever 81 to abut the stop tab 106 against stop wall 107b.

When the vehicle door is opened, the spring 100 has sufficient force to overcome the biasing force of the lever spring 77, and push the plunger 97 out and to the left as viewed in FIG. 1 to pivot the lever in a clockwise direction to where its upper end 83 is located out of the sweep of the outer tang 72. For protection of the tension release mechanism, a plastic cover 99 is secured to the frame side 23 over the relieving mechanism 14.

A description of the operation of the retractor and the tension release will now be given in reference to the sequence of drawings from FIGS. 2-5. The starting position will usually be with the seat belt webbing 13 stowed and fully wound onto the reel 22 prior to the occupant's pulling of the belt to a position about his body. At this initial rewind position (FIG. 2) the spring coil 62 is in its inward axial position with the inner tang 71 located between the frame side 23 and the first engagement member 40, the outer tang 72 disposed about 330° from the stopping surface 87 on the second engagement member 42 and clockwise relative to the lever upper end 83, and the spring coil 62 contracted and gripping the friction surface 70 of the shaft extension 63. As the user pulls the end of the belt 13 to protract the belt webbing from the reel 22, the shaft 27 is rotated in a counterclockwise direction rotating the shaft and gripping spring coil 62 therewith. As the outer tang 72 sweeps counterclockwise, it hits the contact surface 91 of the lever end 83 flipping the lever 81 momentarily outward in a clockwise direction, as seen in FIG. 2, until the tang 72 clears the lever end 83 which allows the lever spring 77 to pivot the lever back to its tang-contact position. Upon further rotation, the outer tang 72 passes axially over of the first engagement member 40 and then contacts the outer camming surface 75 of the second engagement member 42. The outer tang 72 slides up the camming surface 75 biasing the outermost coil turn 79a outward until the tang 72 abuts the stopping surface 87 (FIG. 3) of the second engagement member thereby preventing the spring coil 62 from further counterclockwise rotation; however, as the coil is right-hand wound, the restrained outer tang is urged radially outward (FIG. 7) causing expansion of the coil turns 79 releasing the grip of the clutch coil 62 on the friction surface 70. As the inner coils turns, 79b, 79c are loosened relative to the shaft extension 63, they are biased outward by the outer tang 72 and outer turn 79a and the entire coil 62 slides outward along the shaft to its outward axial position.

After the user has protracted the belt 13 a sufficient distance to enable him to insert the tongue plate in the belt buckle, the user releases the belt, and the reel rewind spring 19 begins to turn the reel 22 in the clockwise direction to retract the belt. As the shaft 27 rotates in a clockwise direction with the spring coil 62 in its outward axial position, the restraint of the outer tang 72 against the stopping surface 87 is relaxed, and the spring coil 62 contracts once again gripping the friction surface 70 and the coil turns clockwise with the shaft extension 63. The outer tang 72 passes across, i.e., axially outward of, the engagement member 40 and the vertical edge 93 of the upper lever end 83. As the outer tang 72 continues to turn past the upper lever end 83, the inner tang 72 approaches the position shown in FIG. 2 and contacts the outer end of the camming surface 74 of the first engagement member 40, and as the shaft 27 and the shaft extension 63 continue to rotate in the clockwise direction, the inner tang 71 is cammed inward by the camming surface until it is stopped between the engagement member 40 and the frame side 23. Because the inner tang 71 is restrained from further clockwise rotation, the spring coil 62 cannot rotate with the shaft extension 63. Instead, the inner tang 71 is urged radially outward and increases the diameter of the coil 62 thereby releasing the coils' grip on the friction surface 70. Because the diameters of the coil turns 79 are enlarged and released from the friction surface 70, the outer turns 79a, 79b follow the inner tang 71 and the inner turn 79c and slide inwardly relocating the coil 62 to its inward axial position returning the spring coil 62 to its initial position as illustrated in FIG. 2. Because the reel rewind spring 19 has a much greater force than the contraction force of the clutch coil 62, the belt 13 is under tension by the reel spring at this position shown in FIG. 2.

To set the belt in tensionless state, the user activates the tension relieving mechanism 14 by pulling the belt 13 outward a short distance, i.e., about 1 to about 5 inches whereby the spring means 50 is rotated from the FIG. 2 position to an intermediate position, such as shown in FIG. 4, but a lesser distance, i.e., less than the 6 inches required to reengage the outer tang 72 with the second engagement member 42. Upon re-release of the belt 13, the shaft extension 63 and coil 62 are rotated clockwise by the reel spring 19 until the outer tang 72 abuts the stop 64 at the upper lever end 83 (FIGS. 5 and 1). The upper tang 72 is prevented from further clockwise rotation, and as further rotational force exerted by the reel spring 19 only serves to encourage the natural contraction of the coil turns 79 on the friction surface 70 tighting the grip of the coil 62, the shaft 27 is prevented from further clockwise rotation thereby relieving belt tension on the wearer.

With the belt 13 held in its tensionless position, the user may lean forward in his seat protracting the belt a short distance without deactivating the tension relieving mechanism because, unless the user pulls the belt outward a sufficient distance to reengage the outer tang 72 with the second engagement member 42, the tang 72, which remains in its inward axial position, will return it to abut end 64 at its tension release position of FIG. 5 when the user leans back to his normal position. The distance between stop end 64 and the contact member 42 in the counterclockwise movement of the tang represents the memory distance.

When the user unbuckles his belt 13, he will generally not pull the belt any significant distance outward, and hence the tension relieving mechanism 52 will be locked in its belt tension release position (FIG. 5) preventing retraction of the belt. However, when the user opens the door of the vehicle, the plunger 97 is pushed to the left to its dotted line position by the spring 100 to bring the plunger finger 103 against the lever tab 104 and to then push thereon to pivot the lower end of the lever 81 pivoting the upper end in the clockwise direction flipping the upper end lever 83 from under outer tang 72 allowing the coil 62 to return to its starting position (FIG. 2) with the inner tang 71 held by the frame side 23 and first engagement member 40. As long as there is tension on the reel shaft 27, the inner tang 71 will be urged radially outward to increase the coil diameter and to thereby release the coils' grip on the friction surface 70 allowing the shaft to rotate and retract the belt 13. Of course, when the belt 13 is fully retracted and the reel shaft 27 is no longer urged in the clockwise direction, the contracting force of the coil 62 reestablishes its grip on the friction surface 70 in preparation for the next protraction of the belt.

Prior to opening a door or at anytime he chooses, the user may release the belt 13 from the tensionless mode to rewind the belt merely by protracting the belt sufficiently to cause the outer tang 72 to swing counterclockwise sufficiently from the stop 64 to hit the stop 87 on the member 42 so that further protraction of the belt expands the coil 62 resulting in the coil subsequently sliding outwardly along the shaft to its outward axial position and then by the user releasing the belt. The coil 62 in its outward position and gripping the shaft extension 63 turns clockwise, with the outer tang 72 passing outward of the vertical edge 93 on lever end 83 until the inner tang 71 engages the lower camming surface 74 resulting in subsequent expansion of the coil turns 79 thereby releasing the gripping of the friction surface 70. This allows rewinding of the belt 13 and inward axial sliding of the coil to the position of FIG. 2 which is the start position for a fully wound reel.

Another embodiment of the invention is shown in FIGS. 8-14 and a "prime" has been added to reference characters similar to those above described. A control means 52' having first engagement member 40' and a second engagement member 42' may be formed by stamping and bending projections from one of the frame member sides 23. The engagement members 40' and 42' provide the stopping and camming surfaces which operate on the inner tang 71' and outer tang 72' to operate the tension relieving mechanism. The coiled spring means 50' is wound around the friction surface 70 of a shaft extension 63 and is axially movable therealong between an inward and an outward axial position. The shorter inner tang 71' has an end segment 111, bent perpendicularly outward from its radially extending main segment 113. The end segment is operated on by a remote actuator assembly 115 (FIGS. 10 and 14) to deactivate the tension relieving mechanism when the door of the vehicle is opened, but otherwise plays no part in the operation of the tension release.

The first member 40' protrudes axially outward from the frame side 23 providing an inner camming surface 74' which engages the outer tang 72' when the spring 50' is in its inward axial position and rotated in its belt retracting (clockwise as shown) direction thereby stopping further clockwise rotation of the spring. However, when the coil 62' is in its outward axial position, the outer tang 72' clears the outer tips 117 of the first member, and the camming surface 74' engages the inner tang 71', the inner tang being restrained from further clockwise rotation when held between the first engagement member 40' and the frame side 23', as best seen in FIG. 12.

The second engagement member 42' is disposed radially outward of the first member 40' and has an arm 119 which angles outward from the frame 23 providing an outer camming surface 75' and an end segment 121 projecting generally perpendicularly outward therefrom providing a stopping surface 87' for the outer tang 72'. The second engagement member 42' is disposed radially outward of the sweep of the first tang 71'. The camming surface 75' of the second engagement member 42' extends outward a sufficient axial distance that when the coil 62', in its inward axial position, is rotated in the counterclockwise direction, the outer tang 72' may contact the camming surface 75' and be cammed outward until abutting against the stopping surface 87'.

A remote pivoted actuator lever 125 (FIG. 14) is spring biased by a lever spring 127 in a clockwise direction to hit the end segment 111 of the inner tang 71' to move the inner tang in a radially outward, coil-expanding, grip-releasing direction. However, when the door of the vehicle is closed, a protrusion 131 extending from the vehicle door holds the lever 125 out of the sweep of the inner tang 71', as shown in FIG. 14 in dotted lines. When the door protrusion 131 holds the lever in its dotted line or inactive position in FIG. 14, the lever 125 is positioned radially outward so that it has no effect on the spring tang 71'. A suitable stop 126 on the retractor side frame limits the clockwise swinging of the lever 126 against the tang 71' to cause the same to turn to expand the coil and release the frictional surface thereby allowing the reel rewind spring to turn the reel shaft and rewind the belt on the reel. The displacement of the spring tang 71' is but a small movement. Likewise, the force to move the spring tang 71' by the lever 125 is quite small.

The preferred actuator lever 125 includes a bent wire form 130 having a first end 131 pivoted in an aperture of the retractor frame. The other leg of the U-shaped wire forms a pivot pin 133 axially aligned with the pivoted end 131 of the wire form to define a pivot axis for the actuator lever. The spring 127 is a torsion spring with and end 135 located under the retractor frame and with another end 137 located under the wire form to urge it to turn clockwise.

A description of the operation of the retractor and the tension release will now be given in reference to FIGS. 10 to 14. The starting position will usually be with the seat belt webbing 13 stowed and fully wound onto the reel 22 prior to the occupant's pulling of the belt to lift the belt to a position about his body. At this initial rewind position, the spring coil 62' is in its inward axial position, and depending on whether or not the tension release was actuated during the previous use of the belt 13, either the outer tang 72' or inner tang 71' will be abutting the inner camming surface 74' of the first engagement member 40' as shown in FIGS. 10 or 12. In either case, protraction of the belt 13 will rotate the shaft 27', shaft extension 63' and spring coil 62' counterclockwise until the outer tang 72' contacts and is cammed axially outward by the outer camming surface 75' of the second engagement member 42' and prevented from further counterclockwise rotation by its abutment with the stopping surface 87' thereof. If the starting position is that of FIG. 12 with the inner tang 71' abutting the first engagement member 40', the outer tang 72' will cam over the outer tips 117 of the first member and fall back inward after clearing it. As described in the previously described embodiment (FIGS. 1-7), the abutment of outer tang 72' with the camming surface 75' will cause the right-hand wound coil 62' to expand the coil thereby releasing its grip on the friction surface 70' for free counterclockwise rotation of the shaft 27 and concommitantly the turns of the coil 62 shift to their outward axial position (FIG. 11).

When the seatbelt 13 is released after buckling, the rewind spring 19 rotates the shaft 27 in the belt retracting (clockwise) direction. With the coil 62' in its outermost position, the outer tang 72' clears the tips 117 of the first engagement member 40', and the coil rotates with the shaft extension 63 until the inner tang 71' contacts the inner camming surface 74' of the first engagement member at a point axially outward of the frame side 23. The inner tang 71' is biased axially inward by the camming surface 74' until it stops between the frame side 23 and the camming surface (FIG. 12). Further biasing of the reel spring 19 urges first tang 71' radially outward causing enlargement of the coil turns with subsequent release of the friction surface 70' for continued clockwise shaft rotation and a concommittant shifting of the coil turns to their inward axial position. If the belt 13 were to be a unbuckled at this point, the reel spring 19 would act to fully retract the belt with the coil 62' in the rotational position of FIG. 12.

When the user desires to have the buckled seat belt shifted to the tensionless state, he activates the tension release mechanism 50' by pulling the belt 13 to protract it from the FIG. 12 position through a short distance, i.e., about 2 to about 5 inches (FIG. 13). By doing so, the shaft 27 is rotated counterclockwise, and the inner tang 71', which is no longer urged clockwise, allows the coil 62' to once again contract to grip the friction surface 70' for counterclockwise rotation with the shaft extension 63. The outer tang 72' cams over the upper surface 137 of the first engagement member 40' but snaps back once it has cleared the outer tips 117 of the first engagement member because the inner, tightly gripping turns are generally unmoved by the outward camming of the outer tang 72'. If the user does not pull the belt 13 a sufficient distance for the outer tang 72' to contact the second engagement member 42', the coil 62' remains in its inward position. Upon re-release of the belt 13, the outer tang 72' contacts and is stopped against the inner camming surface 74 of the first engagement member 40' (FIGS. 10 and 14). The clockwise biasing of the rewind spring 19 acts to tighten the grip of the coil 62' on the friction surface 70' whereby the abutment of the tang 72' against the first engagement member 40' results in gripping of the friction surface 70' by the coil 62' preventing further clockwise rotation of the shaft 27. This holds the reel 22 in its tension relieving position. The coil 62' in its inward axial position gives the tension release a "memory" in that the user may lean forward in his seat protracting the belt a short distance and then lean back with the spring 50' returning to its tension release position with the outer tang engaged with the first engagement member (FIG. 10).

If the tension release is actuated, it will generally remain so when the belt 13 is unbuckled, and so that the belt will not be left dangling over the seat of the vehicle, the lever actuator mechanism 115 automatically actuates the spring means 50' to release its grip on the friction surface 70' when the vehicle door is opened and thereby to cause a rewinding of the belt. Opening the door shifts the protrusion 131 to the left in FIG. 14 and from contact with the lever 125, and allows the lever spring 127 to pivot the lever clockwise (as shown in solid lines in FIG. 14) to hit the bent end 111 of the lower tang 71' thereby moving the lower tang 71' radially outward and expanding the coil 62' diameter to release its gripping of the friction surface 70'. The shaft 27 is now free to rotate clockwise until the belt 13 is fully retracted. Upon full belt retraction and closing of the vehicle door, the coil 62' once again grips the friction surface 70' in anticipation of further protraction of the belt 13. The user may, of course, disengage the retractor from its tension release mode at any time by pulling the seat belt 13 outward six inches or more to where the outer tang 72' contacts the camming and stopping surfaces 75', 87' of the second engagement member 42' and shifts to its outward axial position and release the belt so that the spring 50' returns to the position shown in FIG. 12.

While the seat belt retractors have been described hereinabove as having a configuration in which belt protraction rotates the reel in a counterclockwise direction, the retractor mechanism may have a configuration with a clockwise belt-protraction direction in which case the rotational directions for the described embodiments will be uniformly opposite to those described. Typically, the retractors on the right and left-hand sides of the vehicle are mirror images of each other. Furthermore, the spring coil could be mounted within a cylindrical drum surface that is attached to the reel shaft so that expansion of the coil diameter will grip this inner surface to clutch the spring and surface together. In such a system, a contraction of the spring coils is used to release the gripping action. Thus, a reversal of the operations described in detail above may be made and fall within the preview of this invention. Also, several coils or springs may be used in lieu of one spring. Additionally, the control means may be of various shapes and constructions and need not be of formed from the side wall of the retractor frame as described in the preferred embodiments of the invention.

While the invention has been described in terms of certain preferred embodiments, modifications obvious to one with ordinary skill in the art may be made without departing from the scope of the invention. For example, while it is preferred that the tension release mechanism be formed from engagement members stamped out and integral with one of the sides, it is obvious that one could secure a plate having engagement members to the side of the frame to accomplish the same purpose. A wide variety of actuating mechanisms might be devised to release the grip of the spring when the door is opened or otherwise.

Various features of the invention are described in the following claims.

What is claimed is:

1. In a safety belt retractor, a frame having opposed sides, a reel supported for rotation between said sides, said reel having a belt wound thereabout for protraction and retraction from the reel;
    a reel shaft mounting the reel for rotation;
    spring means biasing the reel to retract and to rewind the belt onto the reel;
    a locking means for locking the belt against further protraction at the time of an accident;
    a tension relieving means for reducing the belt tension from that being exerted on the protracted belt by said return spring;
    said tension relieving means including an extension on said reel shaft having a friction surface thereon;
    a single coiled spring mounted on said shaft extension and having a coil for frictionally engaging said friction surface with a contraction in size of the coil to hold said reel shaft against turning and rewinding the protracted belt thereby relieving tension of said spring means on the protracted belt worn by the occupant, said spring having a first tang connected at one end and a second tang connected at its other end, and
    a control means for changing the size of said coil, said control means comprising a first engagement member integral with one of said sides to engage said first tang for releasing said friction surface for turning, second engagement means integral with said one side to engage said second tang for releasing said friction surface for turning, and a stop to engage said second tang for holding said friction surface against turning.

2. A retractor in accordance with claim 1 wherein said control means shifts said coiled spring axially along said shaft.

3. A retractor in accordance with claim 1 wherein said second tang is connected to the outer end of said spring, said first engagement member has a camming surface engagable with said first tang to shift said coiled spring axially inward along said shaft and said second engagement member has a camming surface engageable with said second tang to shift said coiled spring axially outward along said shaft.

4. A retractor in accordance with claim 3 wherein said control means alternately shifts said spring between an outer axial position where said second tang engages with said stop when said reel is turned in the belt retracting direction and an inner axial position where said second tang engages with said second engagement member when said reel is turned in the belt retracting direction.

5. A retractor in accordance with claim 1 wherein said stop is carried by said first engagement member.

6. A retractor in accordance with claim 5 and a remote actuator operable by said first tang to release said friction surface for turning.

7. A retractor in accordance with claim 1 having a lever member carrying said stop, said lever member pivotable to a position outside the sweep of said second tang.

8. A retractor in accordance with claim 7 and a remote actuator operable to move said lever member to a position outside the sweep of said second tang.

9. A retractor in accordance with claim 3 in which said reel is rotatable in a belt protracting direction to relocate said spring from a first rotational position in its inner axial position and gripping said friction surface, either to an intermediate rotational position with said spring in its inner axial position from where rotation of said reel in the belt retraction direction engages said second tang with said stop or to a rotational position beyond said intermediate position in which said second tang engages said camming surface of said second engagement surface to bias said spring to its outer axial position from where retraction of said reel in the retraction direction engages said first tang with said first member.

10. In a safety belt retractor, a frame having opposed sides, a reel supported for rotation between said sides, said reel having a belt wound thereabout for protraction and retraction from said reel;
    spring means biasing the reel to retract and to rewind the belt into the reel;
    a locking means for locking the belt against further protraction at the time of an accident;
    a tension relieving means for reducing the belt tension from that being exerted on the protracted belt by said return spring;
    said tension relieving means including a rotatable member connected to said reel to rotate therewith and having a friction surface thereon;
    a coiled spring means including at least one coil for frictionally engaging said friction surface with a change in size of the coil to hold said member and said reel against rewinding the protracted belt thereby relieving tension of said spring means on the protracted belt worn by the occupant, and
    control means including a remote actuator operable by a vehicle door for changing the size of said coil to release said friction surface for turning to rewind the belt automatically, said coiled spring means comprising a first spring tang connected to one end of the coil and a second tang connected to the other end of the coil, said control means including a first member integral with said one frame side for actuating a first end of said coil and a second member integral with said one frame side for actuating a second end of said coil to change the size of the coil to selectively release or grip said friction surface.

11. A safety belt retractor in accordance with claim 1 in which said first member has a camming surface for shifting axially the first end of the coil relative to the coil and in which said second member has a camming surface for shifting the second end of the coil relative to the coil.

12. A safety belt retractor in accordance with claim 1 in which said rotatable member is a portion of a reel shaft and in which said coiled spring means is shifted axially along said shaft by said first and second cam means.

* * * * *